(12) United States Patent
Zich et al.

(10) Patent No.: US 7,287,747 B2
(45) Date of Patent: Oct. 30, 2007

(54) PARTITION ASSEMBLY FOR PACKED OR TRAY COLUMN

(75) Inventors: Egon Zich, Leichlingen (DE); Helmut Jansen, Dormagen (DE); Thomas Rietfort, Bottrop (DE); Björn Kaibel, Hilden (DE)

(73) Assignee: Julius Montz GmbH, Hilden (DE)

( * ) Notice: Subject to any disclaimer, the term of this patent is extended or adjusted under 35 U.S.C. 154(b) by 642 days.

(21) Appl. No.: 10/478,320

(22) PCT Filed: Apr. 12, 2002

(86) PCT No.: PCT/EP02/04097

§ 371 (c)(1),
(2), (4) Date: Nov. 18, 2003

(87) PCT Pub. No.: WO02/094408

PCT Pub. Date: Nov. 28, 2002

(65) Prior Publication Data

US 2004/0134135 A1    Jul. 15, 2004

(30) Foreign Application Priority Data

May 18, 2001  (DE) .............................. 101 24 690

(51) Int. Cl.
*B01F 3/04* (2006.01)
(52) U.S. Cl. .................................... 261/114.5; 202/158
(58) Field of Classification Search .. 261/114.1–114.5; 202/158; 52/36.1, 79.1
See application file for complete search history.

(56) References Cited

U.S. PATENT DOCUMENTS 2,836,406 A * 5/1958 Nutter ..................... 261/114.4
2,921,777 A * 1/1960 Hepp ....................... 261/114.2
3,573,172 A * 3/1971 Streuber .................... 202/158
3,686,075 A * 8/1972 Spahn et al. ................ 202/158
3,926,741 A * 12/1975 Bertsch ..................... 202/269
4,230,533 A * 10/1980 Giroux ......................... 203/1
4,582,569 A * 4/1986 Jenkins ..................... 202/158
5,709,780 A * 1/1998 Ognisty et al. .............. 202/158
5,914,012 A * 6/1999 Kaibel et al. ............... 202/158
6,123,323 A * 9/2000 Yoneda et al. ................ 261/96
6,770,173 B1 * 8/2004 Jansen et al. ............... 202/158

FOREIGN PATENT DOCUMENTS

BE          576656      *  3/1959
EP       1 088 577 A1   *  4/2001
WO       WO99/01193     *  1/1999

* cited by examiner

Primary Examiner—Scott Bushey
(74) Attorney, Agent, or Firm—Andrew Wilford

(57) ABSTRACT

A partition for a packed column or a tray column which can carry out separation and/or chemical reactions has at least two partition elements disposed one above another and/or one alongside the other in the same plane, at least one plug and/or clamp connector connecting together the partition elements, and a sealing profile between an inner surface of the column and an edge of the partition elements turned toward the column inner surface. A fastening device is provided for the partition on the column inner surface. Lateral fastening parts of the partition carry inserts of the column and/or column trays. These fastening parts are rectangular profiles having upper sides extending horizontally in the column.

16 Claims, 8 Drawing Sheets

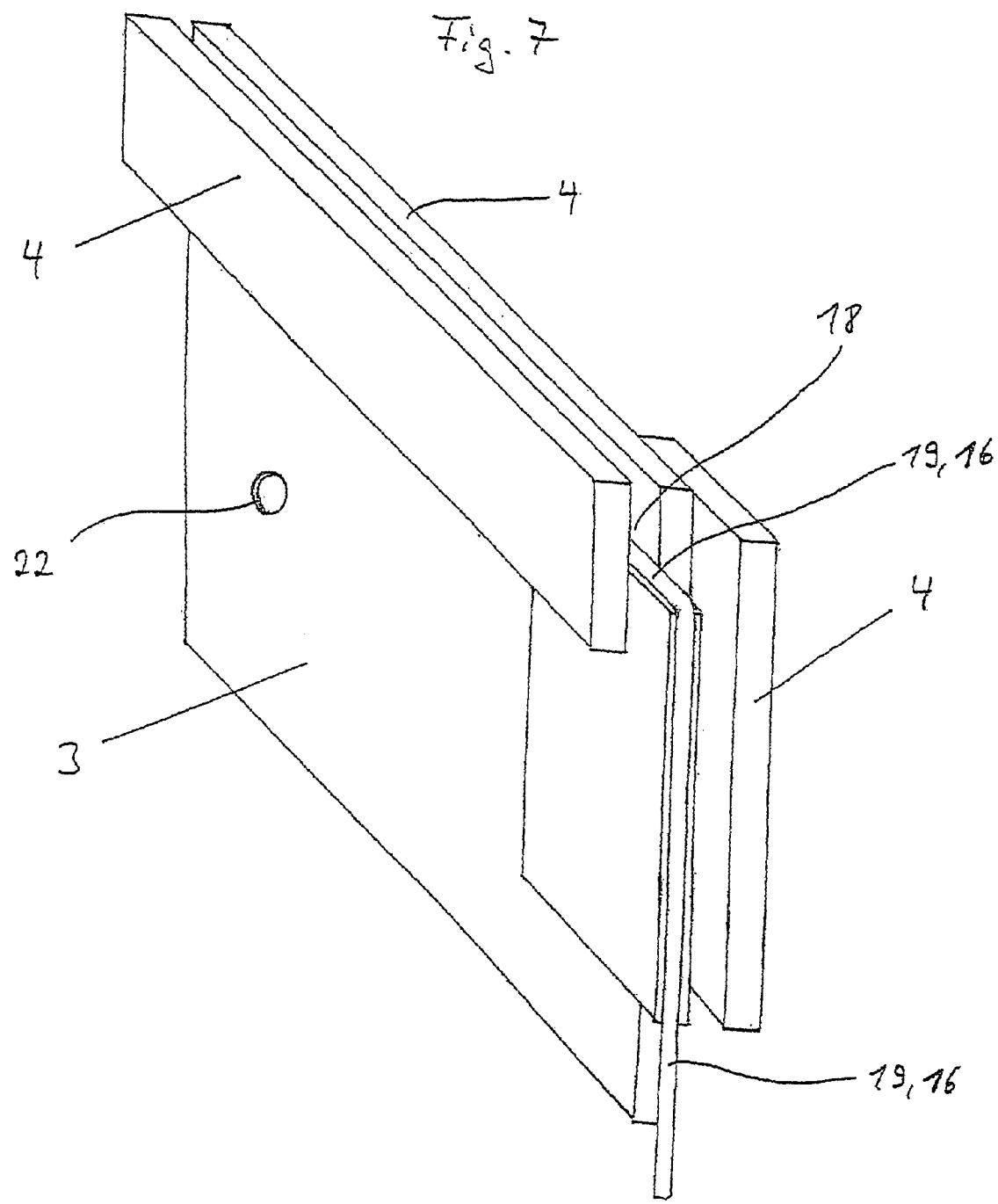

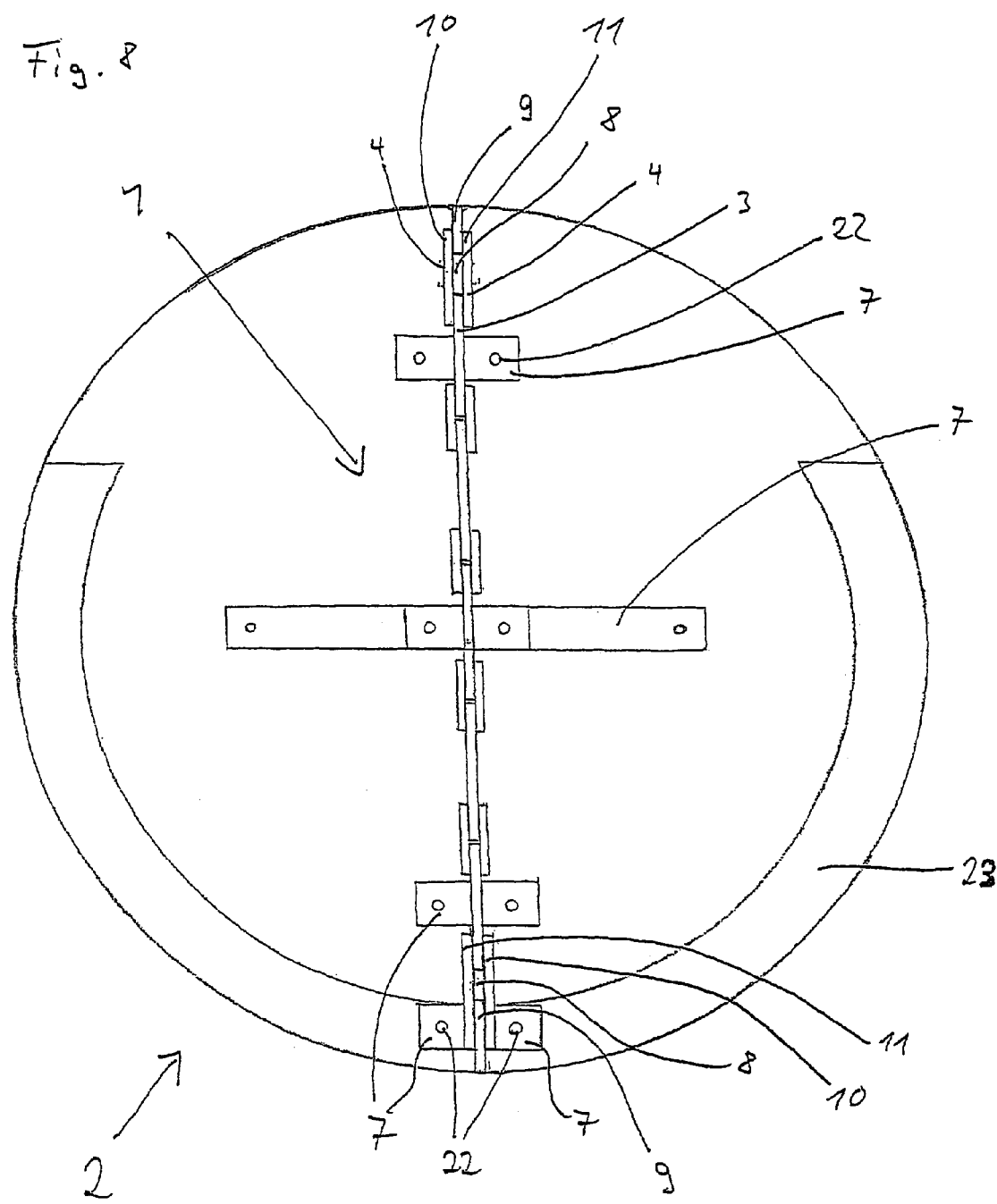

PARTITION ASSEMBLY FOR PACKED OR TRAY COLUMN

CROSS REFERENCE TO RELATED APPLICATIONS

This application is the US national phase of PCT application PCT/EP02/04097, filed 12 Apr. 2002, published 28 Nov. 2002 as WO 2002/094408, and claiming the priority of German patent application 10124690.0 itself filed 18 May 2001.

FIELD OF THE INVENTION

The invention relates to a partition assembly for a column, especially a packed column and/or a tray or plate column for carrying out separations and/or chemical reactions, which have at least two partition elements arranged above one another and/or adjacent one another in the same plane, which are connected with one another by at least one plug connection and/or clamp connection, and with a sealing profile arranged between the column inner wall and the edge of the partition elements turned toward that wall and which have a fastening device for the partition on the inner wall of the column.

BACKGROUND OF THE INVENTION

In the International Patent Application WO 1999/001193, a partition for columns which carry out separations and/or chemical reactions is disclosed. The partition is comprised of a plurality of partition elements arranged one above the other and/or one alongside the other in the same plane. The partition elements are disposed on column trays, horizontally extending plates or grids. These in turn are fastened on support rings which are arranged on the inner wall of the column.

The drawback of this state of the art is that the column trays, horizontally extending plates or grids can only be mounted on the column inner wall at the predetermined support rings. The support rings as a rule, are welded fast with the column inner wall so that a shifting of the support rings is possible only at great expense. That means that the spacing between column trays, horizontally extending plates or grids between which the packing is provided, is not variable.

A further drawback in the case of the above mentioned patent application is that between two partition elements, sealing failures can arise. Even with partition elements which are connected by clamping connections and/or plug connections can sealing failures arise since defects in the fabrication of the clamping connections and/or plug connections can occur. With a certain play in the clamping connections or plug connections, sealing failures can develop together with possible pressure losses.

OBJECT OF THE INVENTION

The object of the invention is to improve a partition of the type described at the outset that in a structurally simple and cost effective manner and way, column, they can be mounted at any location in the column independently of support rings, column baffles and/or column trays which are fixed on the inner walls of the column.

It is also an object of the invention to permanently and reliably seal in a simple and cost effective manner and way, the intermediate spaces defined by individual partition elements, i.e. the clamping and/or plug connections.

SUMMARY OF THE INVENTION

These objects are achieved in accordance with the invention in such manner that the upper edges and/or lateral fastening parts of the partition have baffles of the column and/or column trays or in the intermediate spaces of the plug and/or clamping connections of the partition elements, seals, especially sealing cords are disposed.

Since the partition walls carry their own column-mounting elements, the possibility exists for highly variable positioning of column baffles or mounting structures like, for example, column trays and/or packings, as may be desired at any optional position in the column in a simple and cost effective manner and way. The incorporation of the column baffles or mounting elements is thus independent of support rings which must be applied to the inner walls of the column. This is achieved by fastening parts which are arranged laterally on the partition elements. These fastening parts can be disposed at optional locations, especially on the sides of the partition elements. As a result, any desired baffle height for column baffles can be easily achieved. If so desired, partition elements can be used which have fastening elements in their lower intermediate or upper lateral regions. Depending upon the baffle height or the height of the mounting elements, partition elements can be provided at different height based on which of the fastening elements arranged on the partition elements is used. As a result, upon assembly of the partition, the desired baffle position for the individual column baffles, for example, mass transfer trays can be achieved.

It is advantageous for the lateral fastening parts to be affixed in a force fitting and/or form fitting manner to the partition elements. This leads to a permanent and reliable retention of the fastening elements on the partition elements. The fastening parts can be disposed here at only one side of the partition elements or on both sides of the partition elements thereof.

The fastening parts are ideally profiles or structural shapes, especially rectangular profiles which extend perpendicularly to the column inner wall. The upper edges of the fastening parts which run especially horizontally, serve as rests for the column baffles. The fastening parts can have different lengths. Depending upon the position in which the partition element is to be mounted in the column, the fastening part can be shorter or longer. A partition element which lies closer to the column wall has, for example, a shorter fastening part than a column element which is disposed centrally in the partition. It is not essential that the upper edges of the profile extend horizontally.

A further advantage feature of the invention provides that the parts each have at least one retaining or holding device, especially a bore for the reliable retention of the column baffles. The column baffles are reliably fastened at this retaining device so that a reliable and fixed seating of the column baffles is insured. The retaining device can be configured in various ways. A simple solution is bores in the fastening parts. However, if desired, one or more bores can be provided in the fastening parts. These ideally run vertically or horizontally through the profile.

By a simple screw connection, the column baffles can be fixed to the fastening parts. The retaining devices can also have plug or clamp connectors which receive the column baffles in a form fitting manner. A simple connection is provided by a locking or clip connection. It is further of advantage when the partition elements each have at least one retaining device, especially a bore, for receiving the fastening part or the column baffle.

It is of advantage for the edges of the partition elements according to the invention which are turned toward the column walls to be connected by a plug and/or clamp connector with the sealing profile. This provides in a simple manner and way a reliable and fixed connection between the partition wall element and the sealing profile. The plug and/or clamp connection to the sealing profile is the same plug and/or clamp connection which connects the partition elements together. Alternatively, the edges of the partition wall elements which are turned toward the inner wall of the column can be connected with the sealing profile by a form fitting connection. A form fitting connection, like for example, a weld connection, provides a permanent fixed and tight connection between sealing profile and partition element. A plug and/or clamp connection has the advantage that the partition elements can be easily released from the column inner wall or the sealing wall. An advantageous configuration of the fastening device provides that the sealing profile be arranged in a plane with the partition elements.

It is especially advantageous when the sealing profile has the same thickness as the partition elements. The clamping profiles overlap the partition elements as well as the sealing profile and on both sides and clamp in this manner the sealing profile and the partition elements between them. As a result, since the sealing profiles are fixed on the column inner wall or on projections which are arranged on the column inner wall, the sealing elements can be fixed to the sealing profiles. It is of considerable advantage, furthermore, when the sealing profile and the partition elements are pressed against one another by a pressure element.

This means that, upon or subsequent to the formation of the clamping connection, the intervening space between the edge of the partition element and the sealing profile can be spread in the horizontal direction so that on the one hand the sealing profile is pressed flat against the inner wall of the column and on the other hand the partition elements are pressed together. In this manner, a reliable sealing of the partition elements against one another and a reliable seal of the sealing profile against the column inner wall can be obtained. The partition developed over a multiplicity of partition elements thus has greater stability and sealing characteristics. The pressure element can be a kind of wedge which can be driven from above into the intermediate space. After the interfitting of a series of partition elements, they are shoved together by the introduction of the pressure element into one of the intermediate spaces or in both intermediate spaces so that an absolutely fixed and load carrying structure is formed in the column.

After insertion of the pressure element and the pressing together of the partition elements of a series of the latter, next series or row of partition elements lying thereof is inserted into the lower row and again pressed together by means of pressure elements. The pressure elements can also be inserted horizontally between two partition elements, that is between two partition elements lying one above another in a plane.

It is also conceivable to provide a device comprised of two elongated profiles of which one profile bears on the sealing profile and the other on a partition element. The two profiles can, for example, be pressed by a shifting device against one another and one out of the other. The shifting device can be comprised, for example, of two shiftable rods and, a drive which can shift the rods and a lever actuated by the drive.

The partition elements and the sealing profile can have bores or holes, especially elongated holes, enabling them to be source locking connected with one another. After the pressing apart within the intervening space utilizing the pressing element or after pressing of the partition elements together one below the other, the partition elements and the sealing profiles can be reliably and sealingly connected together by bolts or screws.

A further advantage of the invention provides that the partition elements have gripping devices to ease the alignment and mounting of the partition elements. As a result, the partition elements can be easily connected together. The gripping devices are either directly arranged on the sides of the partition elements or on the fastening elements. The fastening elements can also serve the function as gripping devices.

To permanently and reliably seal the intervening spaces of the individual partition elements, that is the clamping and/or plug connections in a simple and cost effective manner and way, it is advantageous to dispose in the intervening spaces of the plug and/or clamping units of the partition elements, seals, especially sealing cords. In this manner, the sealing between the sealing elements is additionally insured. The seals are especially sealing cords which are introduced upon assembly of the individual partition elements into the clamping or plug connectors. The sealing cords run ideally in one piece over the entire height of the partition element. It is, however, also conceivable that between each individual clamping and plug connector a sealing cord extending over the entire length of the clamping or plug character is introduced. The seals can also be arranged in grooves on the edges of the partition elements. During the pressing of the partition elements together, the sealing cords are so compressed that they insure an absolutely tight connection between two partition elements.

It is also advantageous to provide sealing between the sealing profile and the edge of the partition element turned toward the sealing profile. In this manner an absolutely tight connection is obtained in the connection between the partition and the sealing profile.

Furthermore, in the intervening space of the plug and/or clamp connector of the partition elements and/or between the sealing profile and the edge of the partition elements turned toward the sealing profile, a sealing mass can be introduced. Especially a self hardening sealing mass which is introduced into the intervening spaces of the plug and/or clamp connectors provides a tight connection.

BRIEF DESCRIPTION OF THE DRAWING

Further details and advantages of the subject matter of the invention are given in the following description in conjunction with the associated drawings in which preferred examples with the necessary details have been illustrated. The drawings show.

SPECIFIC DESCRIPTION

Figure 1:
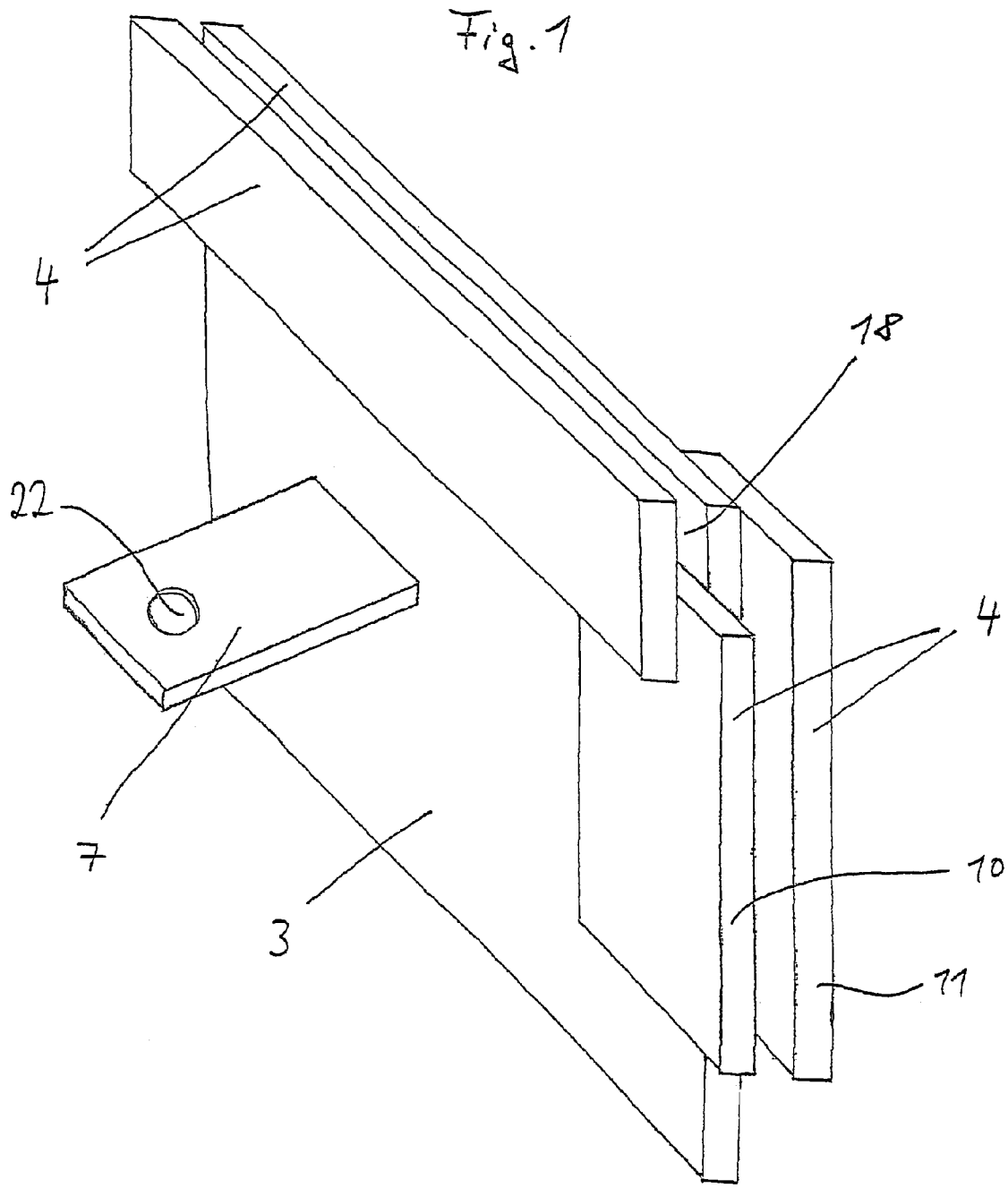
FIG. 1 a partition element with plug or clamp connections and fastening parts.
Figure 2:
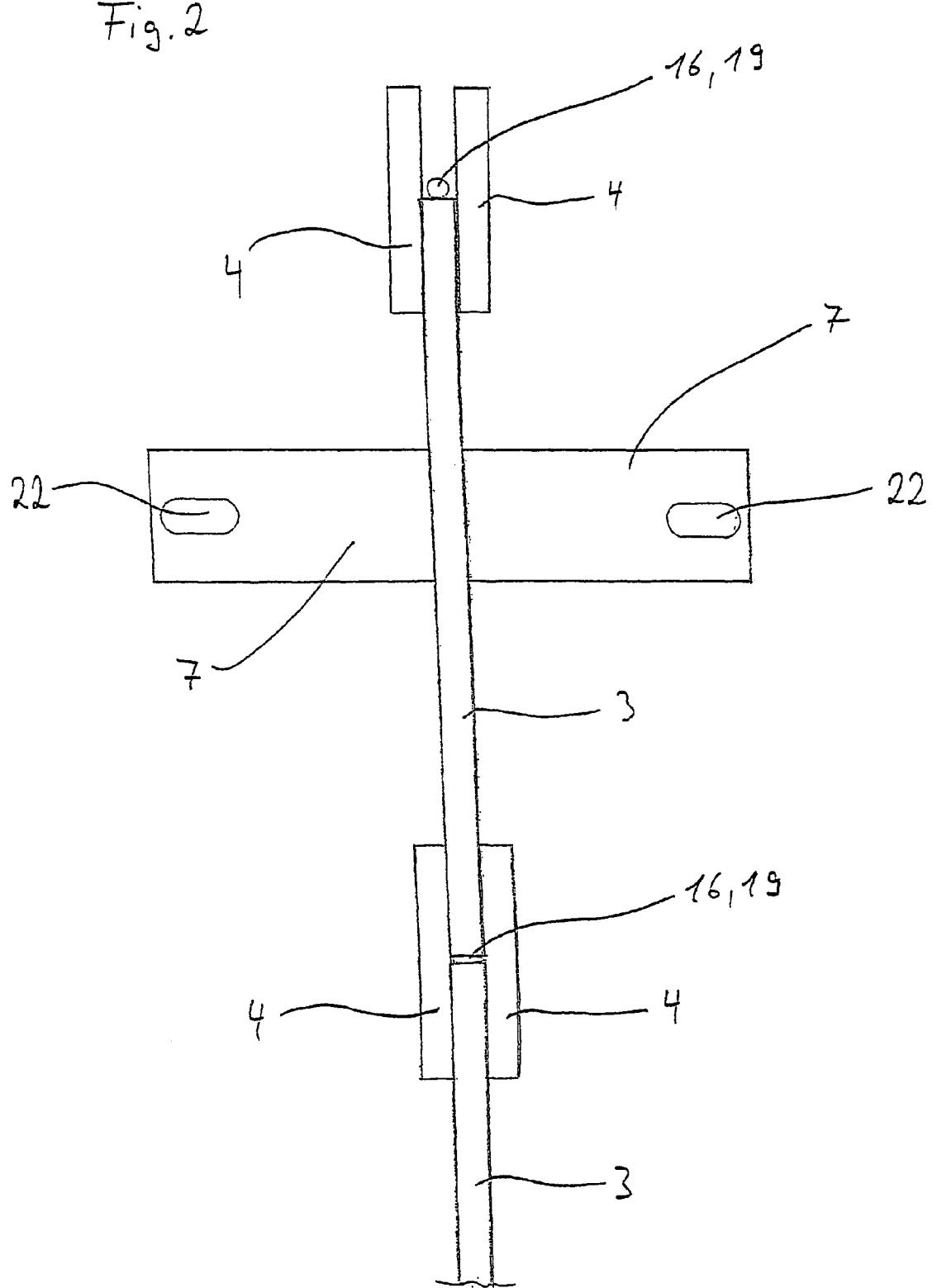
FIG. 2 a plan view of a partition comprised of a plurality of partition elements with fastening parts, FIG. 3 a vertical section through a portion of a column with partition, sealing profiles and fastening parts on several partition elements, FIG. 4 a partition element with plug or clamp connection and fastening part as well as a gripping device, FIG. 5 a partition element with plug or clamp connection and a gripping device, FIG. 6 a plan view of a partition comprised of a plurality of partition elements with fastening parts as well as gripping devices on the fastening parts, FIG. 7 a partition element with plug or clamp connection and seal, and FIG. 8 a horizontal section through a column with a partition comprised of a plurality of partition elements with fastening parts.

In FIGS. 1 and 2 one or two partition elements 3 with plug and/or clamp connectors 4 on their lateral surfaces have been shown. On the sides of the partition elements 3, respective fastening elements 7 are arranged. The fastening elements 7 are welded on the partition elements 3 or are releasably fastened thereon in a force-fitting or form-fitting manner and way. The fastening parts 7 can be arranged at any optional position on the partition elements 3. Thus they can for example also be fastened on the plug or clamp connectors 4. The fastening parts 7 can be arranged on both sides of the partition. The sizes of the fastening elements 7 are variable. Depending upon the mounting position of the partition elements 3 in the column 2, the sizes of the fastening elements can be varied. The fastening elements 7 or the upper edge 13 of the partition 1 can carry column baffles 17, for example mass transfer trays or packings. The partition 1 is so fixed in the column 2 that it can carry the additional weight of the column baffles 17. Additionally, the fastening parts 7 can have holding devices 22 at which the column baffles 17 can be affixed. The holding devices 22 can be plug or clamp connectors. A further simple variant provides that the holding devices are bores 22 at which the column baffles can be releasably attached with the aid of connecting screws or bolts]. It is also possible for the column baffles 17 to form-fittingly rest upon the fastening parts 7 or upon the upper edge 13 of the partition 1. Sufficient stability is then obtained because of the weight and the shape of the column baffle 17.

Figure 3:
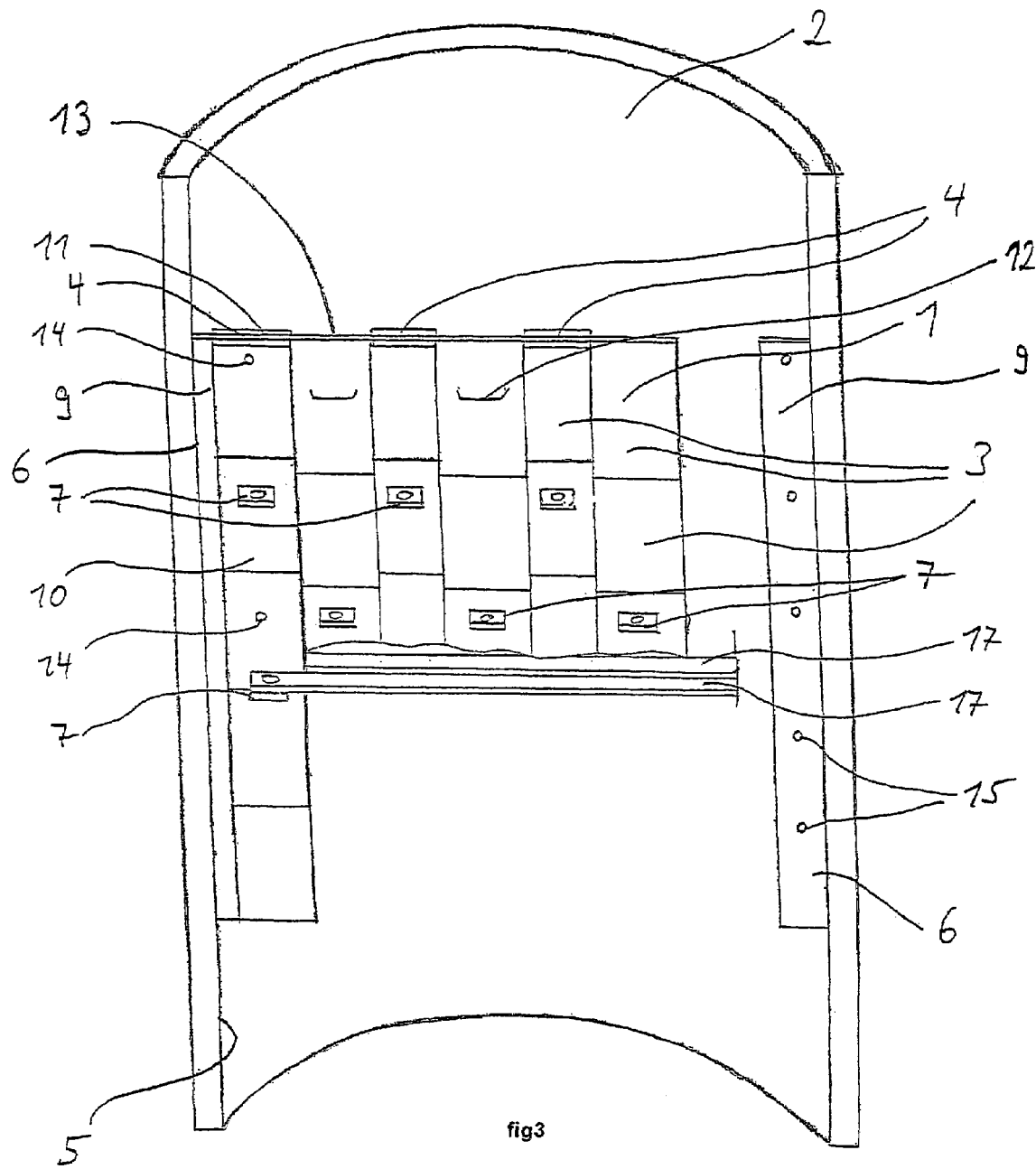

FIG. 3 shows a vertical section through a portion of the column 2 with a partition 1 comprised of a multiplicity of partition elements 3 connected together by plug or clamp connectors 4, and a fastening device 6 for the partition 1 on the inner wall 5 of the column 2. The fastening device 6 is in this example formed by a sealing profile 9 which is fixed, for example by a weld connection to an inner surface 5 of the column 2. The partition 1 divides the column 2 into two halves, whereby the partition 1 separates the inlet of the column 2 from the outlet of the column. The partition 1 is sealingly fastened to both sides of the column wall 5 by the sealing profiles 9. On several partition elements 3, fastening parts 7 with retaining devices 22 are disposed. As a rule, a number of partition elements 3 have their fastening parts 7 arranged in a plane so that a good resting surface or retention for a column baffle 17 is obtained. The column baffles 17 can also serve as additional support elements providing further retention possibilities for trays or similar column inserts.

Several of the partition elements 3 have gripping devices or handles 12. These serve for improved mounting or dismounting of the partition 1. The gripping devices 12 can serve during assembly of the partition 1, to better enable the forces to be distributed to the individual partition elements and enable them to be aligned with respect to one another.

The fastening devices 6, in this embodiment, are formed by the sealing profiles 9 which are welded to the inner surface 5 of the column 2 and, like the partition elements 3, can have elongated bores or holes 15, 14, which can enable them to be connected together in a force-fitting relationship. The bores or holes 14 and 15 are especially located on the clamping profiles 10, 11 of the partition elements 3.

Figure 4:
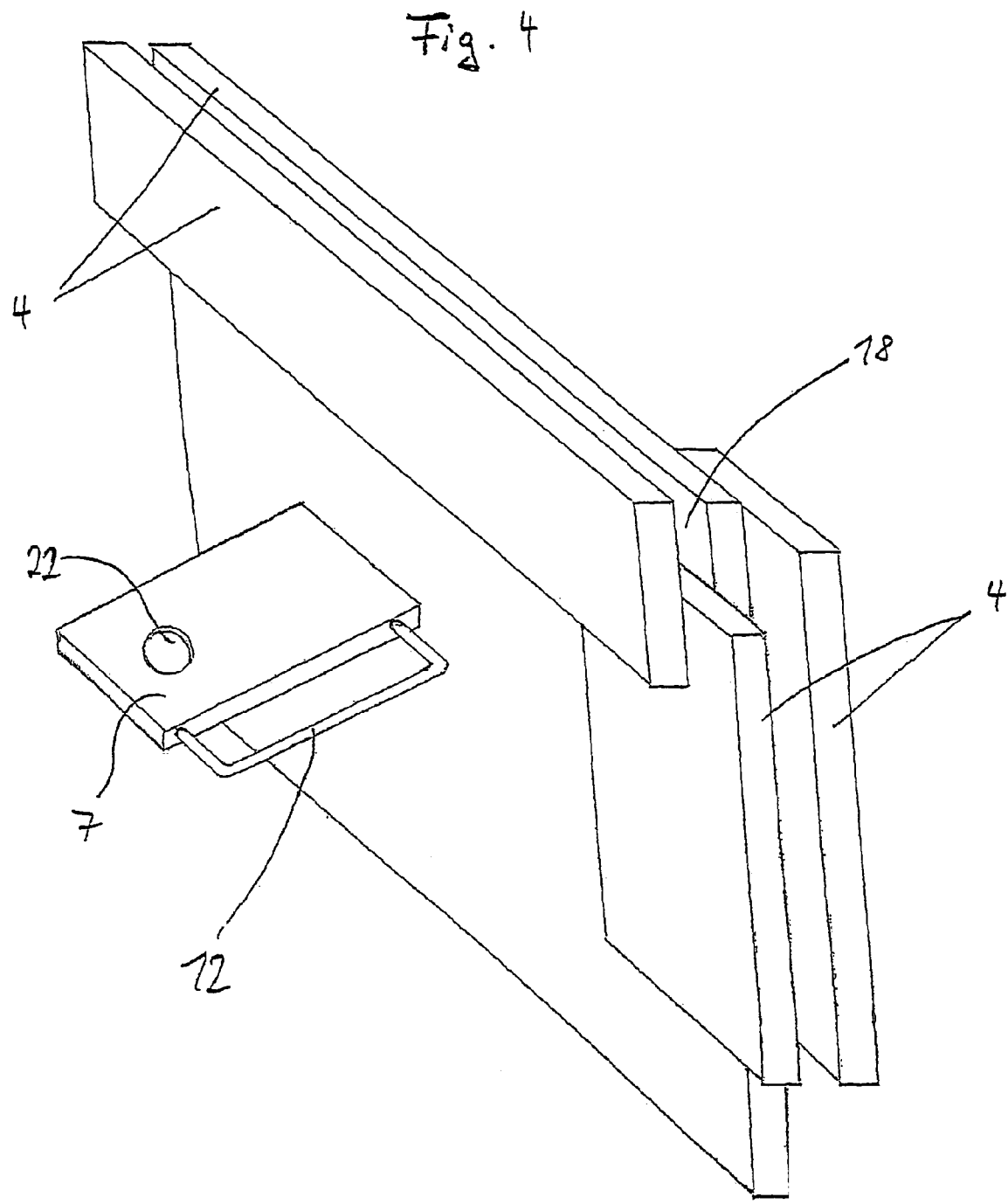
Figure 5:
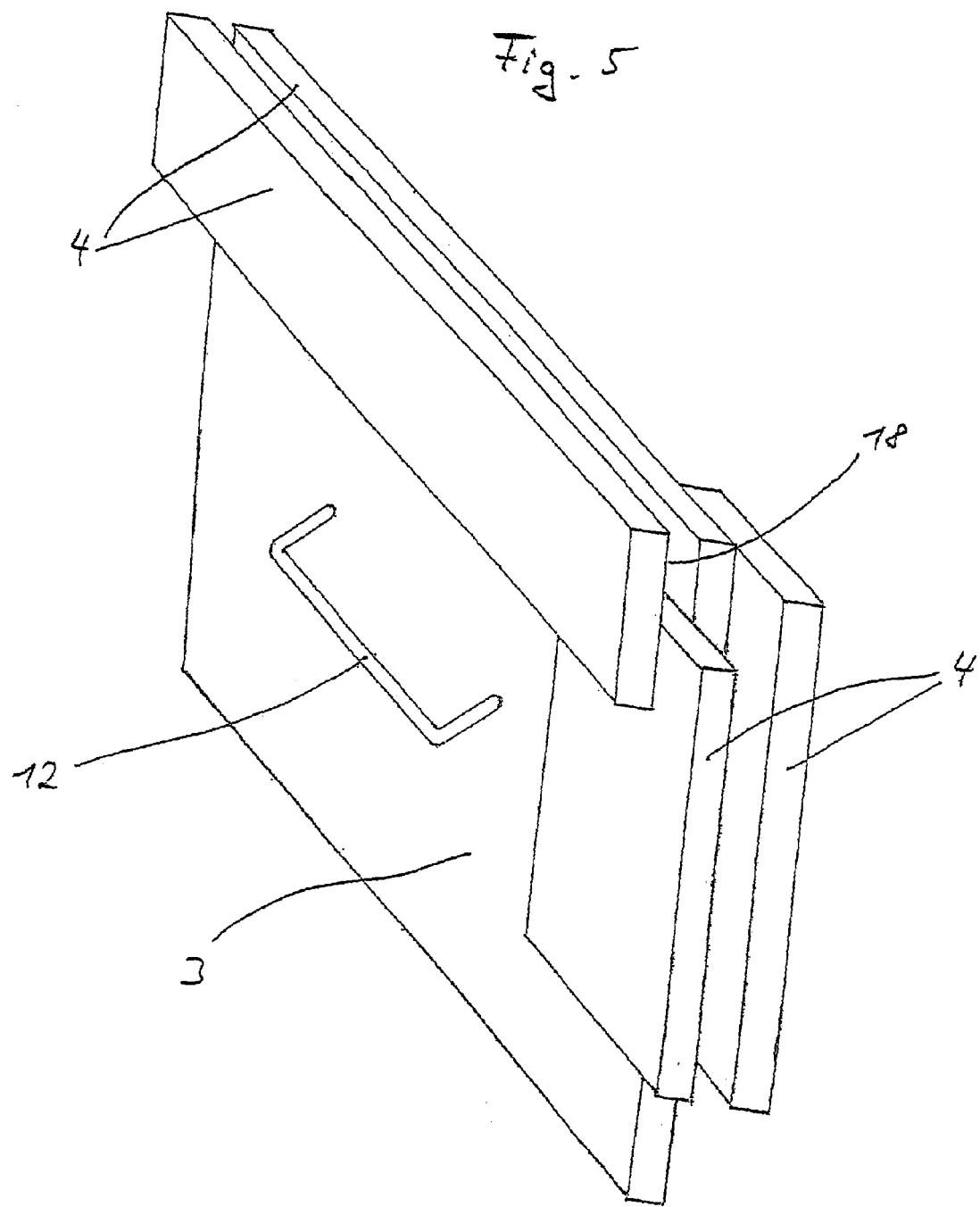

FIG. 4 shows a partition element 3 with a fastening part 7 which is arranged on the side face of the partition element 3. The gripping device 12 is mounted on the fastening part 7. In FIG. 5 the gripping device 12 is mounted directly on the partition element 3. The gripping device 12 can be comprised of a simple profile which is affixed to the partition element 3. Ideally gripping devices 12 are provided on both sides of the partition element.

Figure 6:
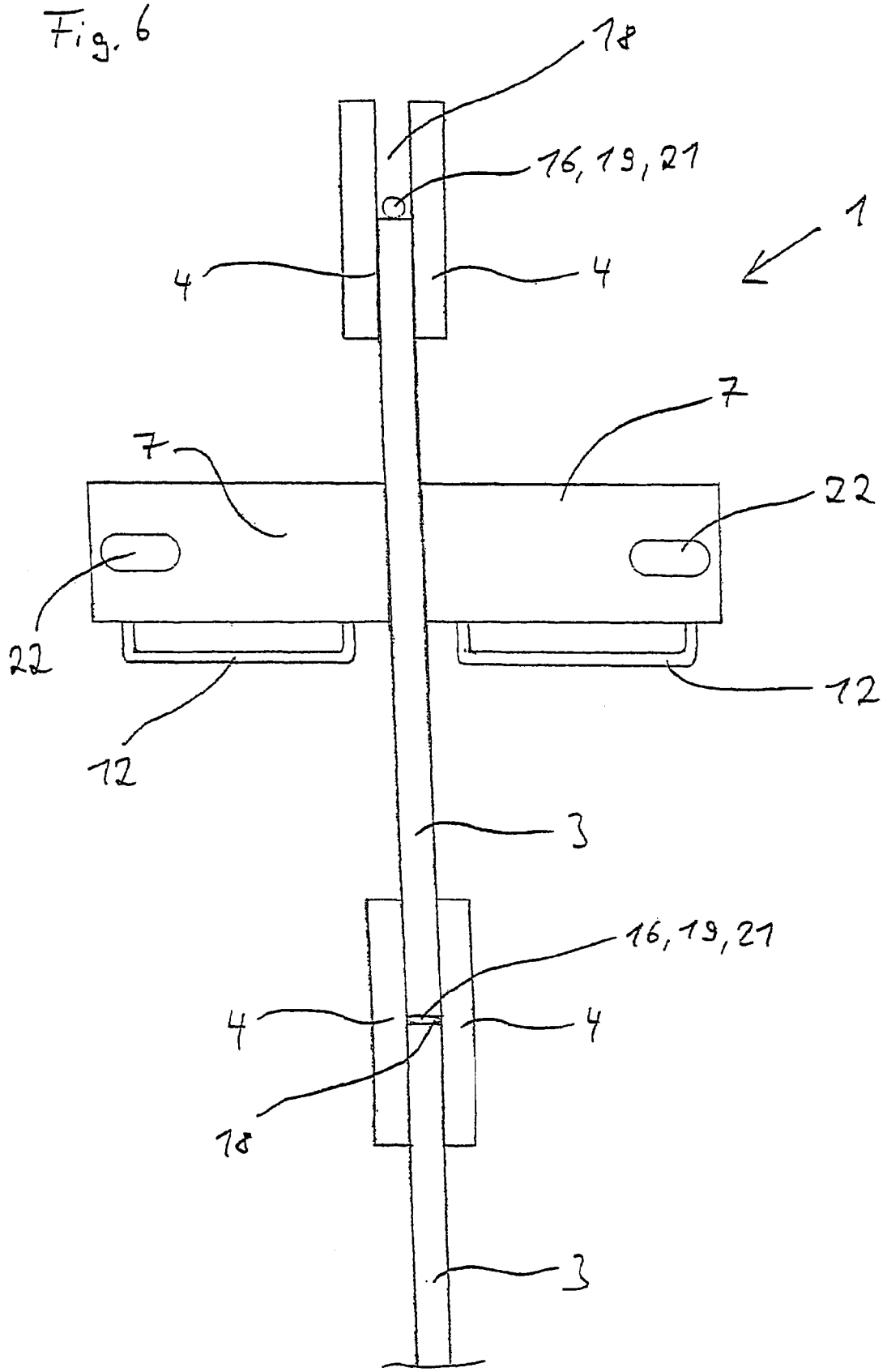

FIG. 6, shows a plan view of a partitions comprised of a plurality of partition elements 3, with fastening elements 7 and gripping devices 12 on the fastening elements 7. On the fastening elements 7 there are also retention devices 22. In this example, the retention devices 22 are elongated holes whose axes run parallel to the partition wall 1. Depending upon the column inserts or baffles 17, the holes 22 can have other orientations as well. In order to obtain an absolutely sealed connection after fitting together the individual partitions 3, according to the invention, a sealing element 19, especially in the form of a sealing cord 16 or a sealing mass 21 can be inserted into the intermediate space 18 of the plug and/or clamp connection 4. After fitting together or clamping the partition elements 3, the seal 19 is elastically deformed and thereby forms an absolutely tight seal connection between the partition elements 3.

In the upper portion of FIG. 6, a nondeformed seal 19 or sealing cord 16 has been shown to be laid into the space 18. At the lower part, the seal 19 or the sealing cord 16 of the interfitted partition elements 3 has been illustrated. At the bottom of the space 18 a sealing mass 21 can also be introduced which upon the interfitting of the partition elements is deformed and then hardens to obtain a sealed connection.

FIG. 7 shows again how the seal 19 or the sealing cord 16 is laid into an intervening space 18. In this Figure another variant of the holding or retention device 22 is shown. The partition element 3 has a retention device 22, in this case a hole, to which a column insert 17 can be fastened. The column insert 17 can be selectively fastened directly to the partition wall 3 or to a fastening part 7 affixed to or on the partition 3.

FIG. 8 shows a horizontal section through a column 2 with a partition 1 comprised of a plurality of partition elements 3. On every other partition element 3, fastening elements 7 are applied on both faces. On these or in these the column inserts 17 can be directly disposed or further support elements can be provided on which the column inserts or baffles 17 are arranged. Between each sealing profile 9 and each outermost partition element 3, an intervening piece 8, especially a pressure element, is provided. The intermediate piece 8 can for example be a wedge which can be driven in from above into the respective intermediate space. The intermediate piece 8 thus introduced insures an absolutely fixed seating of the partition 1. The partition elements 3 are thus fixed and pressed sealingly against one another by the introduction of the intermediate piece 8 so that the partition 1 achieves sufficient stability to support the additional column inserts 17 effortlessly. For additional bracing, the partition 1 can be affixed to a support ring 23.

The invention claimed is:

1. A partition for a packed column or a tray column which can carry out separation and/or chemical reactions, the column comprising:

at least two partition elements disposed one above another and/or one alongside the other in the same plane;
at least one plug and/or clamp connector connecting together the partition elements;
a sealing profile between an inner surface of the column and an edge of the partition elements turned toward the column inner surface;
a fastening device for the partition on the column inner surface; and
lateral fastening parts of the partition carrying inserts of the column and/or column trays, the fastening parts being rectangular profiles having upper sides extending horizontally in the column.

2. The partition according to claim 1 wherein the lateral fastening parts are mounted directly on the partition elements.

3. The partition according to claim 1 wherein the fastening parts each have at least one retention device for receiving the column insert.

4. The partition according to claim 1 wherein the partition elements each have at least one retention device for receiving the fastening part or the column insert.

5. The partition according to claim 1 wherein an edge of the partition element turned toward the column inner surface is connected with the sealing profile and/or the fastening device by a plug and/or clamp connector.

6. The partition according to claim 1 wherein two clamping profiles provided on the edge of the partition element turned toward the column inner surface overlap the sealing profile on both sides.

7. The partition according to claim 1 wherein between two partition elements and/or between a partition element and the sealing profile or the fastening device at least one intermediate part is introduced horizontally or vertically.

8. The partition according to claim 1 wherein the partition elements and the sealing profiles or the sealing devices have bores or holes.

9. The partition according to claim 1 wherein the partition elements to facilitate alignability for mounting have gripping devices.

10. The partition according to claim 1 wherein the plug and/or clamp connectors form intervening spaces between edges of the partition elements, the partition further comprising:
seals in the intervening spaces.

11. The partition according to claim 10 wherein the seals are arranged between sealing profiles and the edges of the partition elements turned toward the sealing profiles.

12. The partition according to claim 10, further comprising
sealing masses in the intervening spaces of the plug and/or clamp connectors of the partition elements and/or between sealing profiles and the sides of the partition elements turned toward the sealing profile.

13. The partition defined in claim 3 wherein the retention device is a bore.

14. The partition defined in claim 4 wherein the retention device is a bore.

15. The partition defined in claim 7 wherein the intermediate part is a pressure element.

16. The partition defined in claim 10 wherein the seals are sealing cords.

* * * * *